(12) United States Patent
Kanai et al.

(10) Patent No.: US 6,200,642 B1
(45) Date of Patent: Mar. 13, 2001

(54) METHOD OF PRODUCING BRAZEABLE ALUMINUM MATERIAL

(75) Inventors: Tomiyoshi Kanai; Masakazu Furuta; Masahiro Kojima; Masafumi Ueda, all of Tochigi (JP)

(73) Assignee: Showa Aluminum Corporation (JP)

( * ) Notice: Subject to any disclaimer, the term of this patent is extended or adjusted under 35 U.S.C. 154(b) by 0 days.

(21) Appl. No.: 08/543,961

(22) Filed: Oct. 17, 1995

Related U.S. Application Data (63) Continuation of application No. 08/174,695, filed on Dec. 27, 1993, now abandoned.

(30) Foreign Application Priority Data

Dec. 29, 1992 (JP) .................................................. 4-362121
Oct. 29, 1993 (JP) .................................................. 5-271890

(51) Int. Cl.$^7$ .................................................. C23C 4/08
(52) U.S. Cl. .................................................. 427/456; 427/455
(58) Field of Search .................................................. 427/455, 456

(56) References Cited

U.S. PATENT DOCUMENTS

| | | | |
|---|---|---|---|
| 2,987,816 | 6/1961 | Noland et al. | 29/493 |
| 3,440,079 | * 4/1969 | Jensen | 427/455 |
| 4,901,908 | * 2/1990 | Negura et al. | 427/456 |

FOREIGN PATENT DOCUMENTS 63-34495 * 2/1988 (JP).

OTHER PUBLICATIONS

Chemical abstracts, vol. 115, No. 20, Nov. 18, 1991, abstract No. 213046z and JP–A–3 035 896 (Mitsubishi Aluminum Co.) Feb. 15, 1991.
Abstract of Japan 60–18294 (Jan. 30, 1985).
Abstract of Japan 2–46969 (Feb. 16, 1990).
Abstract of Japan 1–133671 (May 25, 1989).

* cited by examiner

*Primary Examiner*—Katherine A. Bareford (57) ABSTRACT

A corrosion-resistant and brazeable aluminum material. has an aluminum core, and a thermally sprayed layer formed on the core is composed of a brazing metal intermingled with zinc or its alloy. The brazing metal may be a mixture of aluminum and silicon, an aluminum-silicon alloy, a blend of the mixture with the alloy, or silicon. The brazeable aluminum material may be produced by blending a first powder of the brazing metal with a second powder of a corrosion resistant substance including zinc, so as to prepare a powder mixture, and then thermally spraying the powder mixture onto the aluminum core.

7 Claims, 9 Drawing Sheets

Example 2 (Sprayed layer as a whole) × 500

FIG. 6B

Example 2 (Highlighted Zn in the layer) × 500

FIG. 7A

Example 2 (Highlighted Si in the layer)  × 500

FIG. 7B

Example 2 (Highlighted Al in the layer)  × 500

Example 3 (Sprayed layer as a whole) × 500

FIG. 9B

Example 3 (Highlighted Zn in the layer) × 500

FIG. 10A

Example 3 (Highlighted Si in the layer)   × 500

FIG. 10B

Example 3 (Highlighted Al in the layer)   × 500

METHOD OF PRODUCING BRAZEABLE ALUMINUM MATERIAL

This application is a continuation, of application Ser. No. 08/174,695, filed Dec. 27, 1993 now abandoned.

BACKGROUND OF THE INVENTION

The present invention relates to a brazeable aluminum material, and more particularly to a corrosion resistant brazeable aluminum material for use to construct a heat exchanger or the like apparatuses which are manufactured by the brazing technique and must be resistant, and also relates to a method of producing the corrosion resistant aluminum material.

The term 'aluminum' used herein is meant to include aluminum alloys.

The 'thermal spraying' method is well known and has been proposed to form on aluminum a brazing agent layer composed of an Al-Si alloy, so as to make brazeable materials. Such a simple forming of the brazing agent layer is however not effective to render the materials resistant to corrosion.

It has also been proposed to melt spray Zn or its alloy onto the aluminum surface prior to the melt spraying of the brazing agent, with Zn or its alloy forming a corrosion resistant layer on the surface (see for example the Japanese Unexamined Patent Publication Nos. Hei. 1-157794 and Hei. 2-46969).

It is a disadvantage inherent in this idea that two sets of thermal spraying apparatuses have to be installed in and along a production line, one of them disposed upstream of the other, thus prolonging the production line and raising manufacture cost.

Further, since an entire surface of the brazing agent layer formed on the corrosion resistant layer is left in contact with ambient air, a stable oxide membrane is likely to be formed on the surface. Due to the fact that such a strong oxide membrane impairs the brazeability, any aluminum material producible by the two-step thermal spraying has not been put into commercial use. A first object of the present invention is therefore to provide a corrosion-resistant and brazeable aluminum material which has a thermally sprayed surface layer capable of being manufactured in a production line not prolonged, and nevertheless being highly brazeable.

A second object of the present invention is to provide a method of producing the aluminum material as set forth just above.

In order to achieve the first object, an aluminum material has a surface coated with a thermally sprayed layer which is composed of a homogenized mixture of a brazing metal and Zn (i.e., zinc ) or its alloy. The second object is achieved herein by blending a first powder of a brazing metal with a second powder of a corrosion resistant substance so as to prepare a powder mixture, and then thermally spraying this powder mixture onto an aluminum material surface.

Other objects, features and advantages of the present invention will become clear from the description made below referring to the drawings.

BRIEF DESCRIPTION OF THE DRAWINGS

FIGS. 6A and 6B show a metallic texture of the thermally sprayed layer obtained in Example No. 2 of the first embodiment, in which:

FIGS. 7A and 7B show the metallic texture of the thermally sprayed layer obtained in Example No. 2 the first embodiment, in which;

FIGS. 9A and 9B show a metallic texture of the thermally sprayed layer obtained in Example No. 3 of the first embodiment, in which:

FIGS. 10A and 10B also show the metallic texture of the thermally sprayed layer obtained in Example No. 3 of the first embodiment, in which:

DETAILED DESCRIPTION OF THE INVENTION

An aluminum article used as a core material in the present invention is not restricted to those which are of a specific composition, but may be of any composition depending on its final use. Aluminum may be extruded, rolled, cast or otherwise processed to give the article of any desired configuration or cross-sectional shape, also depending on the final use.

A brazing metal present in a thermally sprayed layer on the aluminum core serves as a brazing agent. Typical examples of the brazing metal are Al-Si alloys (i.e., aluminum-silicon alloys), and they need not be pure alloys but may contain any third components such as Zn (i.e., zinc). Thus, the brazing metal may be an Al-Si-Zn alloy, or a mixture of Al-Si alloy and Al-Si-Zn alloy. Alternatively, a mixture of Al and Si, or a mixture of Al-Si alloy, Al and Si may be employed insofar as they can function as the brazing agent. In a further modification, the brazing agent is Si element which will interact with Al as a matrix of the aluminum material and generate an Al-Si alloy of a kind enabling the brazing of said material when heated to a brazing temperature.

Zn or its alloy improves the corrosion resistance of the aluminum material which will have undergone any brazing process to be adjoined to any material else. Pure Zn, a Zn-Al alloy or a mixture of Zn and Zn-Al alloy may be employed, wherein the Zn-Al alloy is either a pure alloy of Zn and Al, or contains in addition thereto any third elements. Thus, a Zn-Al-Si alloy may be employed.

A flux powder may be contained in the thermally sprayed layer so that the flux need not be applied to the surfaces which has to be brazed subsequently.

Details of the method of making the aluminum material summarized above are as follows.

A first powder of a brazing metal as well as a second powder of a corrosion resistant substance containing Zn are prepared at first. The first powder may be a powder of Al-Si alloy, a mixture of Al powder and Si powder, a mixture of Al-Si alloy powder, Al powder and Si powder, or alternatively only a Si powder.

In a case wherein the Al-Si alloy powder and/or the mixture of the Al powder and Si powder, Si content must be controlled to be about 5% to about 40% by weight of the thermally sprayed brazing agent, taking into account any change or variation in Al and Si contents which may be caused during an actual spraying process. If Si content in the brazing agent is less than about 5% or higher than about 40% by weight, then the brazing agent will have a so high temperature of liquidus line that it is not easy to braze the aluminum articles Thus, the Si content in the first powder is more desirably selected such that Si content in the brazing agent layer will fall within a range of about 8% to about 13% by weight, after thermally sprayed In another case wherein only Si powder is used as the first powder, its purity must preferably be about 98% or higher so that an ideal Al-Si alloy may be produced during the brazing process.

The Zn-containing and corrosion-resistant second powder may be a pure Zn powder, a powder of Zn-Al alloy or a mixture thereof with the Zn powder. Zn content in the second powder must be about 40% by weight or more. A poor content of Zn less than about 40% by weight will fail to form a satisfactory layer having Zn diffused therein. In such a case, not only the corrosion resistance of the brazed articles cannot be improved but also the melting point of the second powder will be undesirably high. There is a possibility that a 'adhesive effect' of the second powder may be lowered by the high melting point thereof, as will be detailed later. Thus, a more desirable Zn content is about 85% by weight or more of the second powder.

The first powder has to be blended with the second powder to give a powder mixture in the invention. In the described case wherein the Al-Si alloy powder and/or the mixture of the Al and Si powders is employed, a ratio by weight of the first powder to the second powder may desirably be about 30:70 to about 95:5. If the ratio of the first powder exceeds about 95% by weight, then the thermally sprayed powder mixture will fail to firmly stick to the aluminum core material. Contrarily to the first powder contained at less than about 30% by weight, an insufficient amount of the brazing agent cannot ensure a high brazeability of the aluminum material. Thus, a more preferable weight ratio of the first powder to the second powder is from about 65:35 to about 90:10. In the latter case of using Si powder as the first powder, the ratio thereof to the second powder is to be about 30:70 to about 95:5, and more preferably about 45:55 to about 90:10, for the reasons mentioned above.

The flux which may be added to the mixture of the first and second powders may be of any suitable kinds. A fluoride flux is preferable in the invention because of its resistance to corrosion. An example of fluoride fluxes a eutectic compound of a substantially complexed structure comprising KF (i.e., potassium fluoride) and $AlF_3$ (i.e., aluminum fluoride) strictly or nearly at a weight ratio 45.8:54.2 of the former to the latter. Other complexes such as $KAlF_4$, $K_2AlF_5$ or $K_3AlF_6$ are also employable. A weight ratio of the flux to the sum of the first and second powders may desirably be about 95:5 to about 60:40. A poor content of the flux less than about 5% by weight will possibly fail to remove the oxide membrane during the brazing process. A quantity the flux more than about 40% by weight will however cause not only an excessive brazing of aluminum material but also a significant amount of flux residue on the surface thereof, thereby impairing the appearance of the brazed articles. Therefore, a more preferable ratio by weight of flux to the powder mixture is from about 90:10 to about 80:20.

The powder mixture, which is composed of the first and second powders and may further contain the added flux, will be thermally sprayed onto the surface of an aluminum core material. A layer of the brazing metal tangled and mingled with Zn or its alloy, and further mingled with the flux in some cases, will be formed on said surface. Such a thermally sprayed layer may preferably be of a thickness of about 10 $\mu$ m or more in order to afford a good brazeability of the aluminum material as well as an improved corrosion resistance thereof after brazed. It is desirable that Zn is contained in the sprayed layer at an amount of about 6 to about 20 $g/m^2$. A poor Zn content below about 6 $g/m^2$ will possibly cause a poor 'adhesive effect' and an unsatisfactory corrosion resistance. A superfluous Zn content higher than about 20 $g/m^2$ will however accelerate the initial corrosion of aluminum articles. Therefore, the most preferable Zn content in the sprayed layer is from about 8 to about 12 $g/m^2$. The content of the optionally added flux in the sprayed layer is desirably from about 1 to about 10 $g/m^2$. A flux content below about 1 $g/m^2$ will be too little to ensure a sufficient brazing, while its content beyond about 10 $g/m^2$ may cause an excessive brazing of aluminum materials and leave a noticeable amount of flux residue thereon to impair their appearance. Thus, the most preferable applied amount of the flux is from about 2 to about 7 $g/m^2$.

The condition of the spraying process is variable or adjustable within a certain range, provided that the second powder for improving corrosion resistance is almost molten (or more desirably, 'completely molten'), with particles of the first powder of the brazing metal remaining solid or only their surfaces being molten. The reason for such a requirement is as follows.

At high temperatures which will cause each first powder particle to entirely melt, a resistant oxide membrane will be produced on the aluminum articles to thereby render them less brazeable. Each of the thermally sprayed particles of the first powder which have entirely molten to their piths will solidify to regenerate such a fine internal texture as if they had been used to braze the aluminum articles. Once the first powder has completely molten, it will no longer be able to act as an effective brazing in a subsequent brazing process. On the other hand, the corrosion resistant second powder is molten so completely that it becomes a liquid which sticks to, or fills interstices between, the first powder particles remaining solid or having only their surfaces molten. This is the 'adhesive effect' referred to above and meaning that the second powder functions as if it were a binder which holds the first powder particles and fix them to the aluminum article surface. Thus, the thermal spraying is carried out under a condition such that the second powder is molten but the first powder is prevented from melting thoroughly. In a thermally sprayed layer obtained in this manner on the aluminum article surface, a number of brazing metal particles almost in their unmolten state are dispersed in a matrix, that is, in the Zn or its alloy as the second powder which has been molten and then solidified. Those brazing agent particles are anchored to the aluminum article surface by means of the matrix composed of Zn or its alloy. It will however be understood that some of the first powder particles may be molten to their piths, or some of the second powder particles may not be molten at all.

In order to protect the first powder from being molten while fully melting the second powder, the thermal spraying must not be conducted at extremely high temperatures which have been the case in the 'plasma-arc spraying'. A preferable temperature is from about 1000° C. to about 3000° C., and more preferably from about 2300° C. to about 2900° C. in a case wherein the first powder is Al-Si alloy powder or a blend thereof with Al powder and Si powder. The particle surfaces will not be molten to a sufficient extent at a temperature below about 1000° C., possibly failing to stick to the aluminum article surface. An extremely high temperature above about 3000° C. will however cause the first powder particles to melt to their piths. In another case wherein Si powder is used as the first powder, a temperature falling within a range of about 2000° C. to about 4000° C., or more desirably from about 2500° C. to about 3500° C., is preferred for the reason described above. Such a moderate temperature may be realized for example in the so-called 'flame spraying' technique.

A distance between a spray gun nozzle and the aluminum core material is preferably from about 50 to about 500 mm in the case of using Al-Si alloy powder and/or the blend thereof with Al and Si powders as the first powder. The distance shorter than about 50 mm will cause the powder(s) to excessively melt, thus not only oxidizing the brazing metal particles, but also bringing about thermal deformation and/or an undesirable change in fine internal texture of the aluminum core material. On the other hand, a longer distance beyond about 500 mm will allow the partially or completely molten particles to solidify well before reaching the aluminum core, thereby reducing deposit amount of the powder and impairing the brazeability. Thus a more preferable range of the distance is from about 150 to about 300 mm. In the case of using only the Si powder, a distance of about 50 to about 400 mm, or more preferably about 200 to about 300 mm, must be kept between the spray gun and core material. Feed rate of the mixture of first and second powders is desirably from about 30 to about 180 grams/minute (i.e., g/min), because a feed rate less than about 30 g/min will result in a poor brazeability due to shortage of the first powder. A feed rate higher than about 180 g/min will however produce a thermally sprayed layer too thick to be economical and free from shrinkage and exfoliation from the aluminum core. A more preferable feed rate of the powder mixture is thus from about 90 to about 150 g/min.

In order to avoid the melting of the first powder, its particles must ideally or substantially be of a spherical shape rather such a flat shape as those of an 'atomized' powder. Since finer particles tend to be molten rapidly and completely, a preferable particle size of the first powder is at least about 10 μm in average diameter. However coarser particles of an average diameter larger than about 200 μm will produce chinks or interstices between the adjacent particles of the first powder. In such an event, a local deficiency of the brazing metal would take place. Thus, a preferable range of the particle size of first powder is from about 10 to about 200 μm, and more desirably about 50 to about 150 μm.

Particle diameter of second powder is from about 10 to about 200 μm in order to ensure its 'adhesive effect' as the binder as well as its stickability to the aluminum core. A finer powder of less than about 10 μm in particle diameter has an excessively large effective surface area, which will cause a more amount of oxide and a poorer stickability. A coarser particles of more than about 200 μm in diameter will render it difficult for the second powder to smoothly melt for the 'adhesive effect'. A more desirable range of the average diameter is from about 10 to about 150 μm for the second powder.

At least about 10%, or more desirably at least about 50% by weight of the first powder is composed of spherical particles so as to flow smoothly through a fine nozzle of the spray gun. The same applies also to the second powder. An average particle diameter of the flux is desirably from about 10 to about 200 μm.

The thermal spraying is carried out preferably within a non-oxidizing atmosphere such as $N_2$ gas which protects the powder particles from oxidation. Further, oxygen content in said particles must desirably be about 0.05 wt. % at highest, for the same purpose. The particles containing more than about 0.05 wt % of oxygen are less stickable when hot sprayed and less brazeable after hot sprayed.

The described thermal spraying may be carried out while uncoiling a coiled aluminum sheet, or alternatively and if possible in a continuous and more efficient manner while the sheet is being extruded from an extruder.

The corrosion-resistant and brazeable aluminum material prepared in the described manner will be used as one part which is to be brazed to the other part to manufacture an aluminum product. The brazing of those aluminum parts will be carried out by heating them to a temperature of about 600° C. In the course of the heating of said parts, Zn or its alloy will start to melt at about 400° C. while chemically destroying the oxide membrane present on the surface of the thermally sprayed brazing agent layer. As a result, Zn or its alloy will be distributed over the surface of the aluminum core, to thereby form a corrosion resistant layer thereon. At the same time, Si will interact with Al in the aluminum core to produce an Al-Si alloy, in a case wherein Si is employed as the brazing metal. As the temperature further raises, the brazing metal will melt to braze the parts mentioned above one to another. In a case wherein the flux is contained and dispersed in the sprayed layer, it also melts at the raised temperature. The molten flux will destroy and eliminate the oxide membrane so as to render the other part wettable with the brazing agent.

According to the present invention, the first powder of the brazing metal and the second powder of the corrosion resistant substance are thermally sprayed in harmony onto the aluminum core. Therefore, it is no longer necessary to successively form the corrosion resistant layer and the brazing agent one after another. Now, a single sprayer suffices well and the production line need not be prolonged due to plural sprayers which heretofore have been indispensable and have raised production cost. The corrosion resistant Zn or its alloy as the second powder does coexist with and is homogeneously mingled with the brazing metal in the invention. Consequently, the surface area of the brazing agent in contact with air is decreased to a noticeable extent, whereby formation of the oxide membrane which would hinder the brazing process is diminished.

When brazing the aluminum material described above to the other material, Zn or Zn alloy contained in the former and of a lower melting point will melt at first to remove the oxide membrane from the surface of the brazing agent. Thus, there is no afraid that any such oxide membrane would hinder the brazing process from proceeding smooth to give a satisfactory result.

Since the thermal spraying is carried out at such a moderate temperature as allowing the second powder to melt but inhibiting the first powder from doing so, the powder particles are protected well from oxidation which would impair the brazeability of aluminum material. The moderate temperature of the thermal spraying process does also allow each particle of the first powder to have its pith unmolten and maintain its original fine internal texture. In other words, the first powder particles will not change their internal texture as if they had already been undergone the brazing and then solidified again. Thus, such a pith of each first powder particle affords an excellent brazing process for the aluminum articles.

Zn or its alloy, which has molten and then solidified during the thermal spraying process, sticks to the first powder particles and fills the interstices therebetween so as to function as a binder for said particles. Further, Zn or its alloy closely adheres to the surface of the aluminum core so that the thermally sprayed layer will not exfoliate from said core-even though the first powder has not molten during the spraying process. Thus, the first powder of the brazing metal is kept stable on the surface of aluminum core.

If the flux is present in the thermally sprayed layer, then no additional amount of flux need not be applied to the adjoining surfaces prior to the brazing process.

DESCRIPTION OF THE PREFERRED EMBODIMENTS

First Embodiment

In this embodiment of the present invention, an Al-Si alloy powder or a mixed powder of Al and Si was used as the first powder of the brazing metal.

Figure 1:
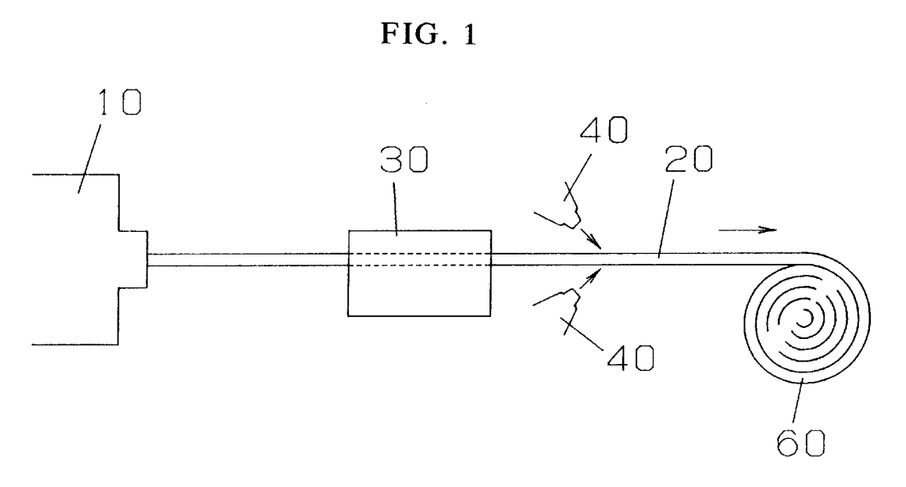
FIG. 1 is a front elevation diagrammatically showing the step of thermally spraying a prescribed composition, in embodiments of the present invention.
Figure 2:
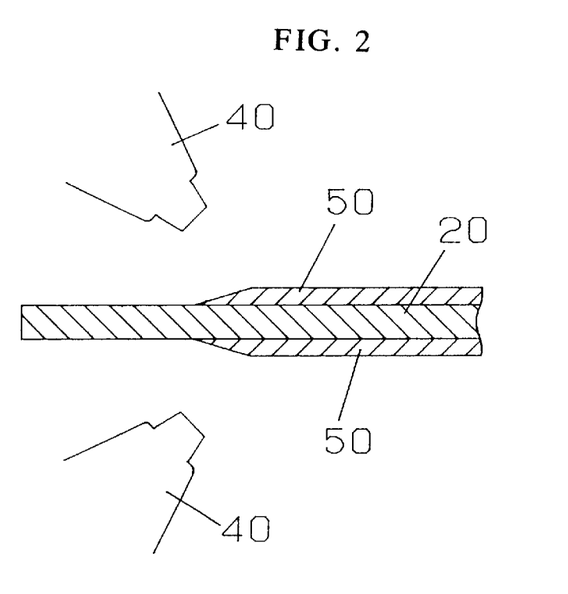
FIG. 2 is a cross section illustrating in part and on an enlarged scale the step shown in FIG. 1.
Figure 3:
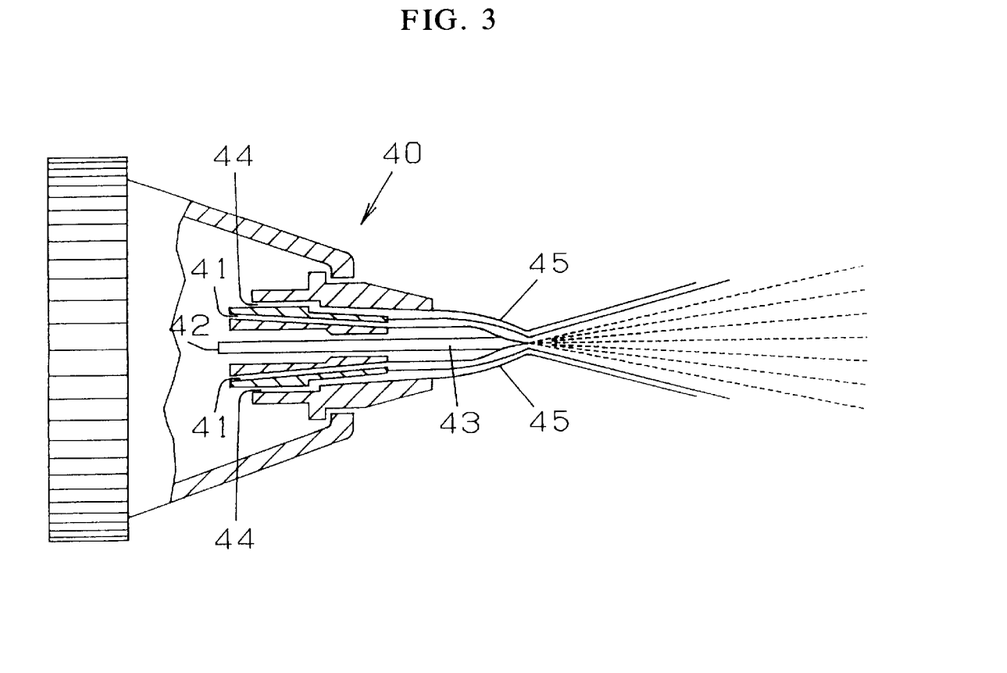
FIG. 3 is an enlarged cross section of a spraying gun used in the embodiments.

A JIS-1070 aluminum alloy was used to extrude a perforated and flat tube 16 mm wide, 3 mm high and having a wall thickness of 0.5 mm. The alloy extruded from an extruder 10 as illustrated in FIGS. 1 and 2 was then cooled in a water bath 30, before continuously taken up to form a coil 60. A pair of upper and lower spray guns 40 were disposed downstream of the water bath 30, and above and below the extruded tube 20, respectively. Each spray gun 40 was slanted towards the coil 60 and had a nozzle of the flame type as sketched in FIG. 3. A fuel pipe 41 supplied the nozzle with a mixed gas of fuel and oxygen so that the gas ejected from the nozzle was fired to continuously form a flame of columnar shape. A brazing agent powder 43 carried by a carrier gas was supplied through a powder feed pipe 42 and into the flame so as to be heated therein. A compressed air from an air pipe 44 was blown through the nozzle into said frame. A mist jet thus producec to suspend therein the heated powder was blown forwards to stick to the surface of extruded aluminum article 20. The reference numeral 45 in FIG. 3 denotes an air stream. Each of those spray guns were operated at: $O_2$ feed rate of 700 liters/min: propylene feed rate of 68 liters/min; and a compressed air feed rate of 800 liters/min. The flame temperature (that is, thermal spraying temperature) was set at about 2700° C.

Types of thermally sprayed powders, Si content and a content of Zn (as a second powder) as well as the spraying condition were varied in this embodiment as listed in Tables 1 and 2. The first powder was hindered from melting within the thermally sprayed powder stream, but with the second powder being allowed to melt to form an upper and lower thermally sprayed layers 50 on the surfaces of extruded article 20.

Average thickness of the thermally sprayed layers in the obtained brazeable aluminum materials was measured to give a result shown in Table 2. The sprayed layers were visually inspected, and a slight exfoliation was observed in the sprayed layers of Example Nos. 10 and 12. However, the exfoliation was judged to be almost harmless in practical use. A 'breathing' intermission was observed in the thermally sprayed flame in Example No. 17.

Figure 4:
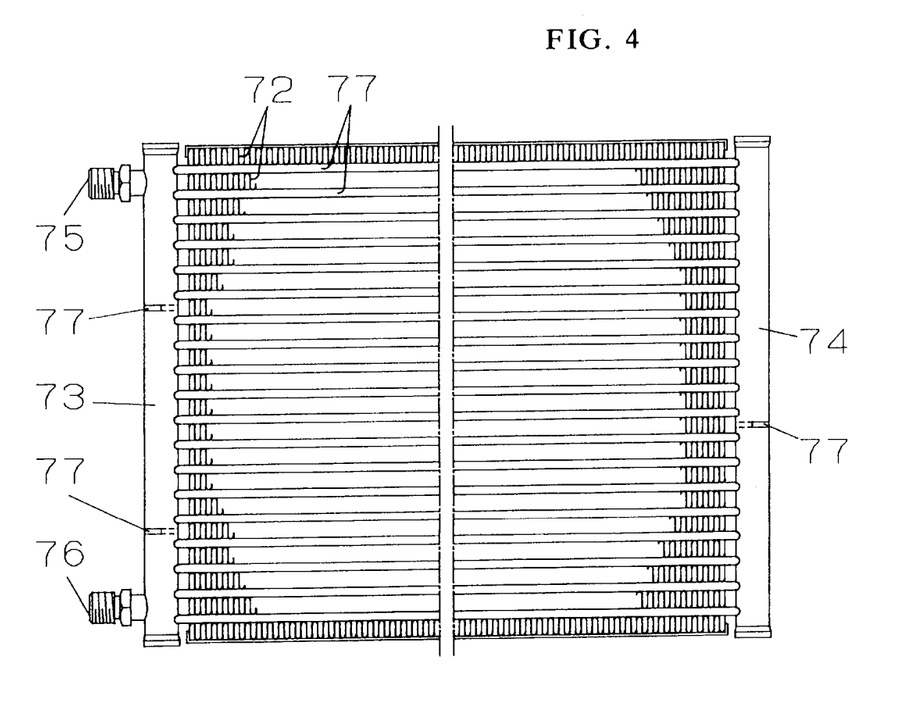
FIG. 4 is a front elevation of a multi-flow type heat exchanger made of an aluminum material produced in the embodiments.
Figure 5:
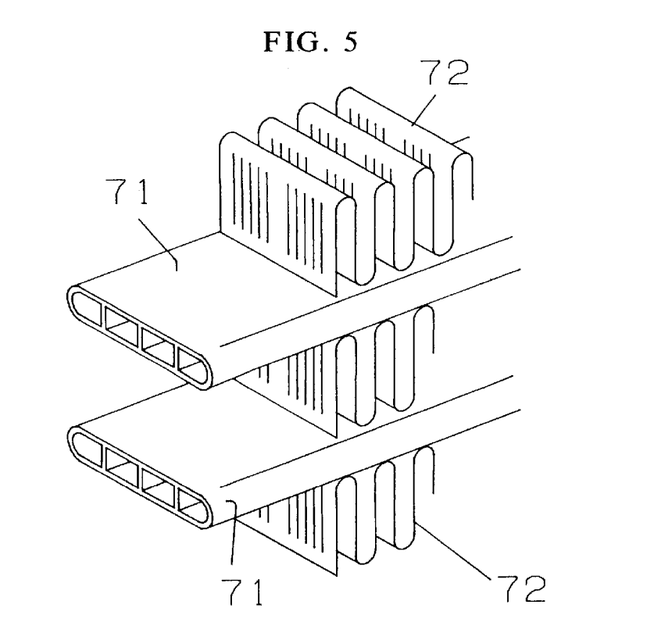
FIG. 5 is a perspective view of tubes and corrugated fins constituting the heat exchanger shown in FIG. 4, with the tubes and corrugated fins separated from other members of the heat exchanger.

The thus prepared brazeable aluminum materials were used to fabricate heat-exchanging tubes, which were then assembled to give an aluminum heat exchanger of the multiflow type as shown in FIGS. 4 and 5. This heat exchanger comprises a plurality of the tubes 71 arranged horizontal in parallel with each other, in combination with a plurality of corrugated fins 72 each interposed between the two adjacent tubes. Both ends of each tube are connected to left- and right-hand hollow cylindrical headers 73 and 74 in fluid communication therewith. A coolant inlet pipe 75 and outlet pipe 76 are adjoined to a periphery of the left-hand header 73, at its upper and lower ends, respectively. Partitions 77 secured in the headers provide a meandering path for the coolant flowing through the heat exchanger. The corrugated fins 72 are 0.15 mm thick and made of an aluminum alloy included in the JIS-3003 series.

A flux emulsion was applied to the assembled heat exchanger and then dried before heated in $N_2$ at 600° C. for 3 minutes. Due to this heating, the tubes 71 were rigidly adjoined to the corrugated fins 72 and to the headers 73 and 74, with other relevant members also being brazed one to another. The thermally sprayed layer covering the tubes 71 served to adjoin them to the fins 72, while thin brazing agent sheets clad on outer and inner periphery of the headers 73 and 74 contributed to adjoin them to the tubes 71.

BrazeabilLty of each Example was evaluated by measuring a "bonded ratio" for the heat exchangers as to their tubes 71 to which the corrugated fins 72 had been adjoined. The "bonded ratio" is a ratio of the number of the fin's ridges which remain adjoined to the tube after forcibly removing portions thereof other than the ridges, to the total of ridges initially included in one fin. The number of partially remaining ridges was divided by 4 (four) to be added to the number of ridges remaining perfectly bonded.

Reference No. 21 was a sample prepared by the DC arc thermal spraying of Zn to form a Zn layer 1.6 μm thick an the extruded tube of a JIS 1070 aluminum alloy. The corrugated fins in Reference No. 21 were made from a brazing shaet of a JIS 3003 aluminum alloy, which had its surfaces each clad with an Al-Si brazing agent layer 20 μm thick. The tubes were similarly incorporated in a heat exchanger as shown in FIGS. 4 and 5 and subsequently subjected to the brazing process under the same condition as the Examples, before determining the 'bonded ratio'.

Data which were obtained in the described manner are given in Table 2.

Figure 6A:
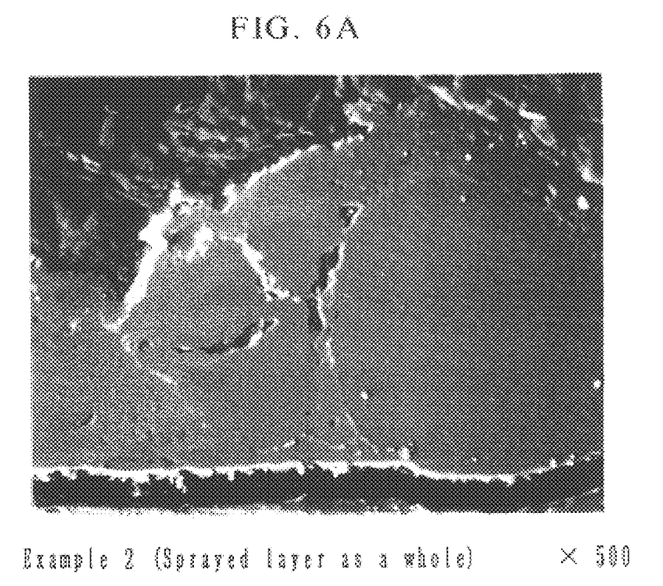
FIG. 6A is a cross-sectional photograph of the sprayed layer as a whole.
Figure 6B:
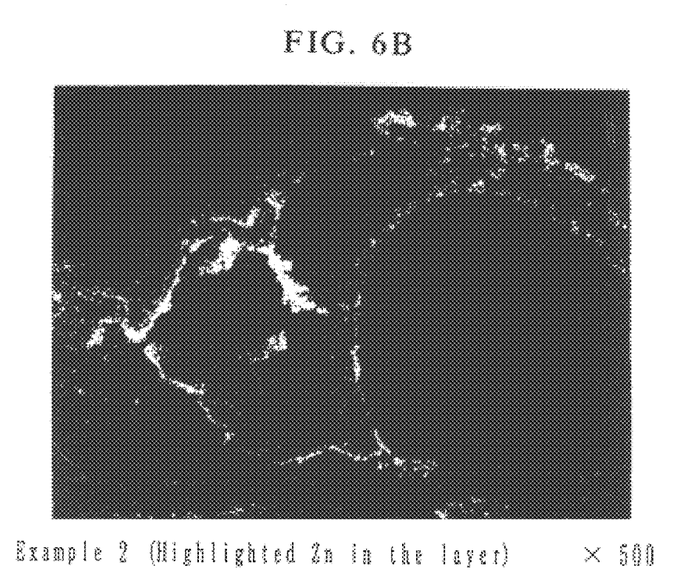
FIG. 6B is another photograph taken by highlighting a Zn stratum in the sprayed layer.
Figure 7A:
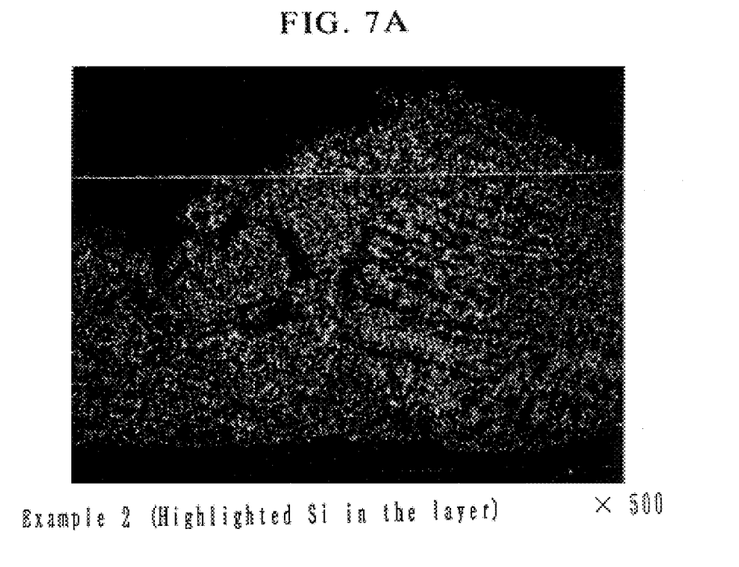
FIG. 7A is a further photograph which was taken by highlighting a Si stratum in the sprayed layer in Example No. 2.
Figure 7B:
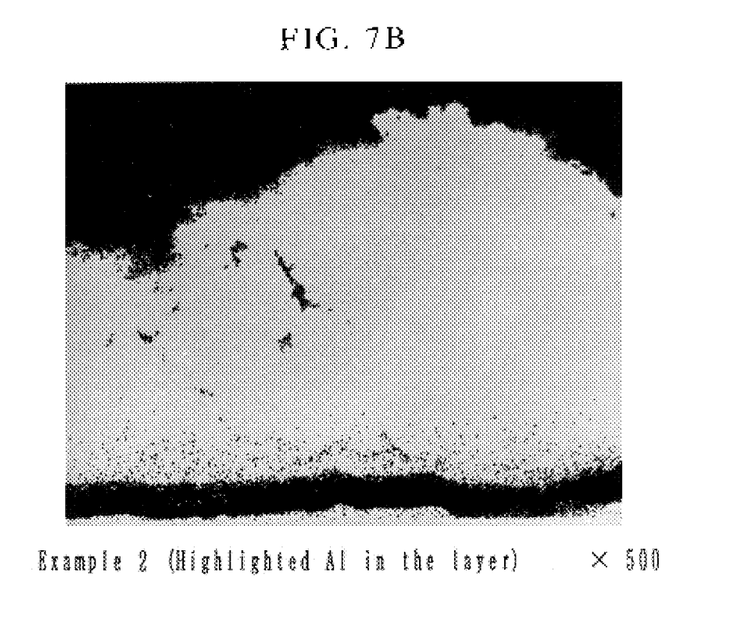
FIG. 7B is also a further photograph taken by high lighting an Al stratum in the sprayed layer.
Figure 8:
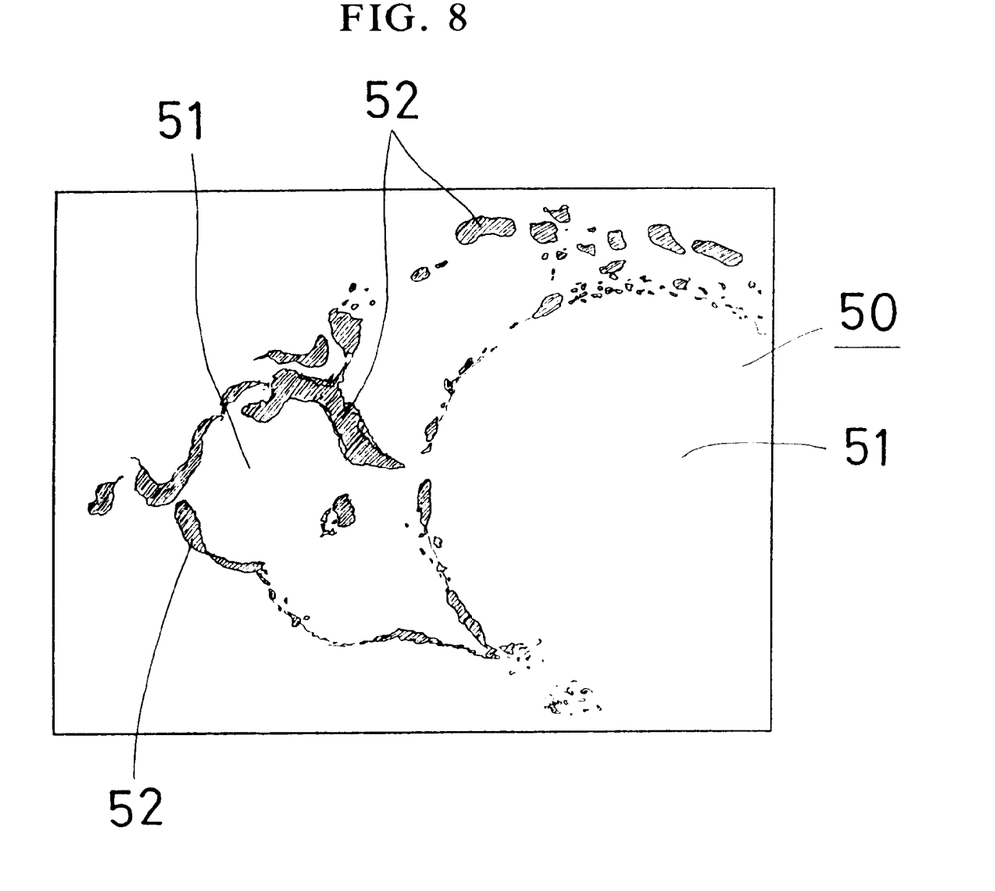
FIG. 8 is a sketch of the texture shown in FIGS. 6A and 6B.
Figure 9A:
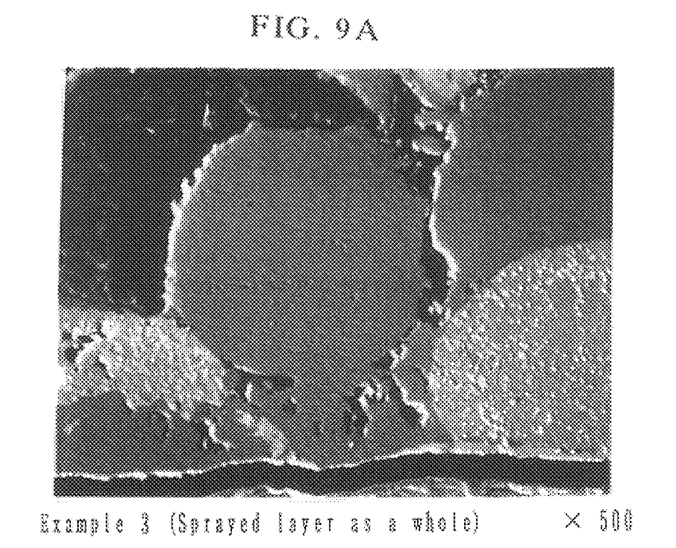
FIG. 9A is a cross-sectional photograph of the sprayed layer as a whole.
Figure 9B:
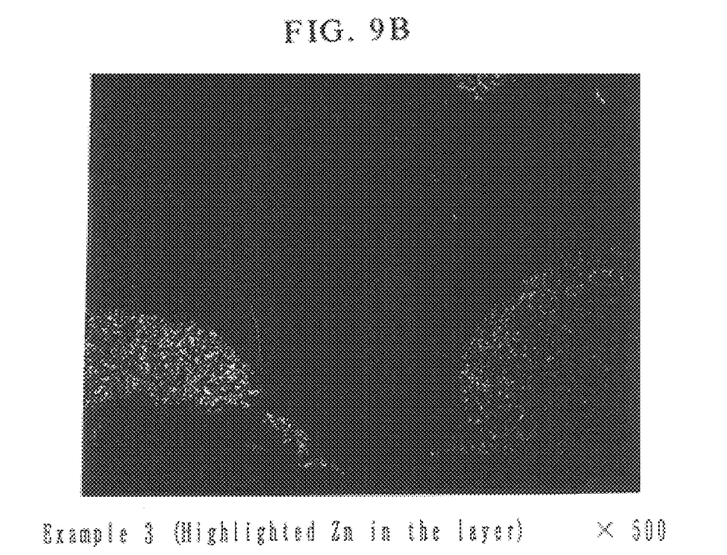
FIG. 9B is another photograph taken by highlighting a Zn stratum in the sprayed layer.
Figure 10A:
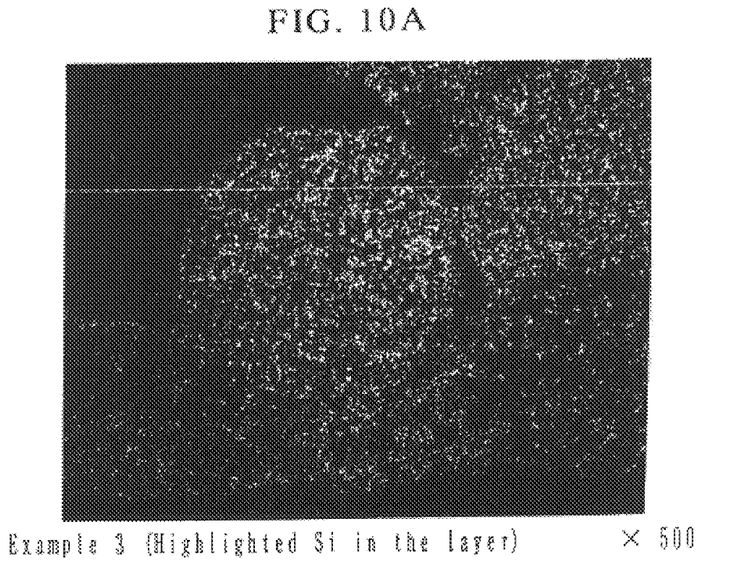
FIG. 10A is a further photograph which was taken by highlighting a Si stratum in the sprayed layer of Example No. 3.
Figure 10B:
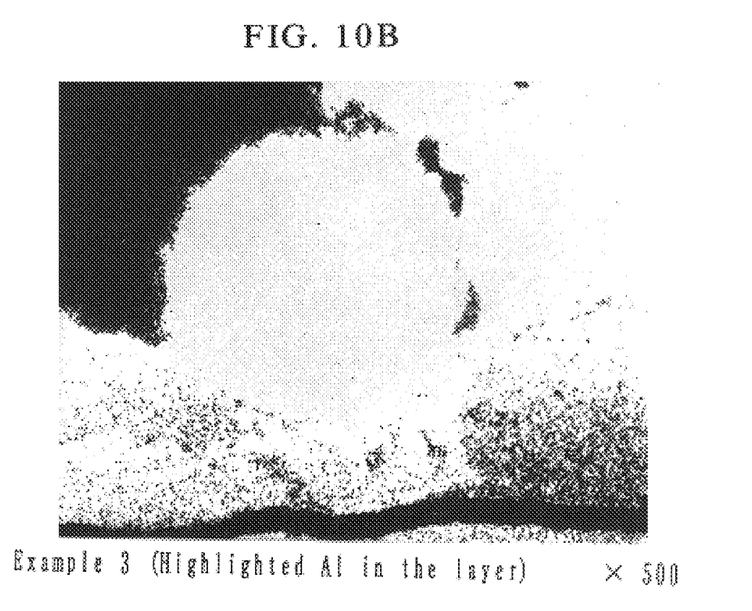
FIG. 10B is also a further photograph taken by highlighting an Al stratum In the layer of Example No. 3.
Figure 11:
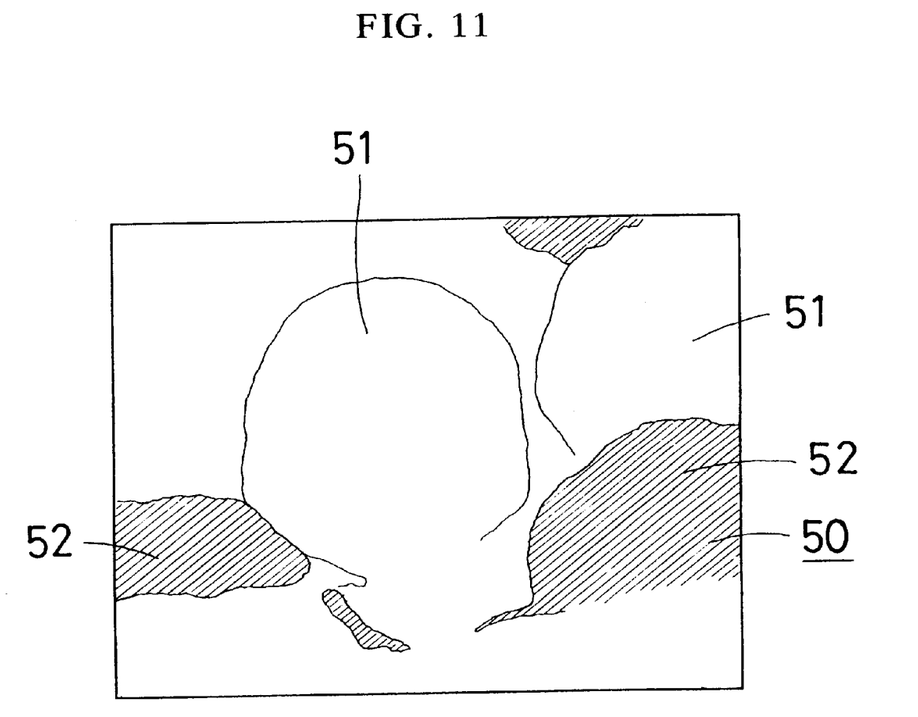
FIG. 11 is a sketch of the texture shown in FIG. 9A and 9B.

The thermally sprayed layers formed to cover the extruded tubes in Example Nos. 2 and 3 were subjected to microscopical inspection prior to assemblage of the heat exchanger. Enlarged photographs of metallurgical texture are: FIGS. 6A to 7B for Example No. 2; and FIGS. 9A to 10B for Example No. 3. FIGS. 6A and 9A are cross-sectional photographs of the sprayed layers each in Its entirety, FIGS. 6B and 9B are those taken by highlighting their Zn strata, with FIGS. 7A and 10A highlighting their Si strata and FIGS. 7B and 10B highlighting their Al strata. FIGS. 8 and 11 symbolically represent the textures shown in FIGS. 6A and 6B and in FIGS. 9A and 9B, respectively.

As will be clearly seen in the photographs of metallurgical textures in FIGS. 6A to 7D and FIGS. 9A to 10B,

TABLE 1

|  | First Powder | | | | Second Powder | | | | Ratio of 1st powder to 2nd powder (wt.) | Ratio of sphr. particles (%) |
| --- | --- | --- | --- | --- | --- | --- | --- | --- | --- | --- |
|  | Type | Av. dia. (μm) | O$_2$ cont. (wt. %) | Si cont. (wt. %) | Type | Av. dia. (μm) | O$_2$ cont. (wt. %) | Zn cont. (wt. %) | | |
| Examples | | | | | | | | | | |
| 1 | A | 100 | 0.01 | 12 | C | 50 | 0.01 | 95 | 70:30 | 60 |
| 2 | A | 90 | 0.03 | 12 | C | 45 | 0.02 | 95 | 85:15 | 50 |
| 3 | A | 80 | 0.03 | 12 | E | 45 | 0.02 | 45 | 85:15 | 50 |
| 4 | A | 120 | 0.01 | 11 | D | 40 | 0.01 | 100 | 65:35 | 100 |
| 5 | A | 110 | 0.02 | 10 | C | 40 | 0.02 | 98 | 60:40 | 60 |
| 6 | A | 150 | 0.01 | 12 | C | 80 | 0.01 | 85 | 80:20 | 70 |
| 7 | B | 50 | 0.01 | 9 | C | 30 | 0.01 | 95 | 70:30 | 70 |
| 8 | A | 120 | 0.01 | 11 | D | 40 | 0.01 | 100 | 95:5 | 100 |
| 9 | A | 110 | 0.02 | 10 | C | 40 | 0.02 | 98 | 50:50 | 60 |
| 10 | A | 250 | 0.01 | 12 | C | 50 | 0.01 | 95 | 70:30 | 70 |
| 11 | A | 5 | 0.01 | 12 | C | 40 | 0.01 | 95 | 70:30 | 70 |
| 12 | A | 100 | 0.01 | 12 | C | 5 | 0.01 | 95 | 70:30 | 70 |
| 13 | A | 90 | 0.01 | 12 | C | 150 | 0.01 | 95 | 70:30 | 70 |
| 14 | A | 100 | 0.01 | 4 | C | 50 | 0.01 | 96 | 70:30 | 70 |
| 15 | A | 100 | 0.01 | 20 | C | 50 | 0.01 | 94 | 70:30 | 70 |
| 16 | A | 100 | 0.01 | 12 | C | 50 | 0.01 | 60 | 70:30 | 70 |
| 17 | A | 100 | 0.01 | 12 | C | 50 | 0.01 | 95 | 70:30 | 5 |
| 18 | A | 100 | 0.1 | 12 | C | 50 | 0.02 | 95 | 70:30 | 70 |
| 19 | A | 100 | 0.02 | 12 | C | 50 | 0.09 | 95 | 70:30 | 70 |
| 20 | A | 100 | 0.01 | 12 | C | 50 | 0.01 | 95 | 70:30 | 70 |
| Reference | | | | | | | | | | |

Zn-coated tubes in combination with corrugated fins which are made from a brazing sheet clad with a brazing agent layer.

Notes:
A = Al—Si alloy powder,
B = mixture of Al powder and Si powder,
C = Zn—Al alloy powder,
D = Zn powder,
E = Powder of 'Al-45 wt. % Zn-5.5 wt. % Si' alloy,
Av. dia. = Average diameter,
cont. = content

TABLE 2

|  | Condition of spraying | | Average thickness of sprayed layer (μm) | Brazeability (ratio of bonded fins) (%) | Corrosion resistance (corroded depth of tubes) (μm) | Temp. of spraying (° C.) |
| --- | --- | --- | --- | --- | --- | --- |
|  | Distance (mm) *1 | Feed rate (gr/min) *2 | | | | |
| Examples | | | | | | |
| 1 | 200 | 120 | 20 | 100 | 130 | ca. 2700 |
| 2 | 150 | 120 | 20 | 98 | — | ca. 2700 |
| 3 | 150 | 120 | 20 | 97 | — | ca. 2700 |
| 4 | 200 | 120 | 25 | 98 | — | ca. 2700 |
| 5 | 200 | 120 | 30 | 97 | — | ca. 2700 |
| 6 | 200 | 120 | 22 | 99 | — | ca. 2700 |
| 7 | 200 | 120 | 20 | 98 | — | ca. 2700 |
| 8 | 200 | 120 | 25 | 84 | — | ca. 2700 |
| 9 | 200 | 120 | 30 | 89 | — | ca. 2700 |
| 10 | 200 | 120 | 22 | 75 | — | ca. 2700 |
| 11 | 200 | 120 | 20 | 87 | — | ca. 2700 |
| 12 | 200 | 120 | 20 | 81 | — | ca. 2700 |
| 13 | 200 | 120 | 20 | 86 | — | ca. 2700 |

TABLE 2-continued

|    | Condition of spraying | | Average thickness | Brazeability (ratio of | Corrosion resistance (corroded | Temp. |
|----|---|---|---|---|---|---|
|    | Distance (mm) *1 | Feed rate (gr/min) *2 | of sprayed layer (μm) | bonded fins) (%) | depth of tubes) (μm) | of spraying (° C.) |
| 14 | 200 | 120 | 20 | 82 | — | ca. 2700 |
| 15 | 200 | 120 | 20 | 73 | — | ca. 2700 |
| 16 | 200 | 120 | 20 | 70 | — | ca. 2700 |
| 17 | 200 | 120 | 20 | 83 | — | ca. 2700 |
| 18 | 200 | 120 | 20 | 88 | — | ca. 2700 |
| 19 | 200 | 120 | 20 | 92 | — | ca. 2700 |
| 20 Reference | 200 | 120 | 5 | 66 | — | ca. 2700 |
| 21 | — | — | — | 99 | 140 | — |

Notes:
*1 distance between nozzle and aluminum core,
*2 feed rate of brazing agent powder the brazing metal particles 51 were kept spherical in the thermally sprayed layers 50. This indicates that only or no surface portion of each particle was temporarily molten before subsequently solidified again, with the pith thereof being kept solid. The photographs also show that the temporarily molten Zn covered each particle of the brazing metal. Table 2 attests also the formation of a sufficient fillet in each brazed portion of the material provided herein, and those fillets improve its brazeability comparable with or better than that of the Reference No. 21 made of the brazing sheet.

The heat exchanger samples prepared using the tubes made of aluminum materials in accordance with Example No. 1 and Reference No. 21 were subjected to the 'CCT' (i.e., Complicated Corrosion Test). Corroded depth after 120 cycles was measured for the tubes to give a result listed in Table 2, and the depth was 130 μm for Example No. 1 and 140 μm for Reference No. 21. Thus, it was confirmed that the present invention could enhance to the material a corrosion resistance comparable with the prior art one.

Second Embodiment

In this embodiment, a Si powder was used as the first powder.

Types of thermally sprayed powder, the content of Zn and the blend ratio of powders as well as the spraying condition were varied in this embodiment in a manner as listed in Tables 3 and 4. Other conditions were set at the same as those in the first embodiment. Thermally sprayed layers were formed on the surfaces of each extruded material 20. Purity of the used Si powder was 98%, and the so-called 'breathing' was observed when thermally praying the powder mixture onto Example No. 47.

The brazeable aluminum materials thus obtained was then subjected to measurement of a total amount of the Si powder and the powder of Zn or its alloy, to give a result listed in Table 4. Lesser amounts of the powders caught by the surfaces of the aluminum cores were observed for: Example No. 43 (representing coarser particles of Si powder), Example No. 46 (representing coarser particles of Zn alloy powder); Example No. 51 (representing a longer distance between the spray gun and the core); and Example No. 52 (representing a lower temperature of the thermal spraying). Enlarged photographs were taken to inspect the metallurgical texture of thermally sprayed layers in the Examples. It was observed that the particles of Si powder were kept unmolten to be spherical in Example Nos. 41, 43, 44, 47, 49, 50 and 54 to 56, and the molten Zn alloy was filled in interstices between the unmolten Si particles. The particles of Zn alloy powder in Example No. 45, 46 and 52 melted to a slightly insufficient extent, temporarily during the thermal spraying. Quantity of Zn alloy powder in Example No. 48 was slightly insufficient, though it thoroughly melted. A part of Zn alloy powder in Example No. 51 melted but coagulated undesirably on the aluminum core. Particles of both the Zn alloy powder and Si powder in Example Nos 42 and 53 tenmporarily melted when thermally sprayed. Surface oxidation of Si powder particles in Example No. 50 was noticeably serious.

The brazeable aluminum materials thus prepared in the second embodiment were then subjected to the following tests.

Resistance to Exfoliation

In order to evaluate the stickability of the thermally sprayed layers, each tested tube was severed into pieces 600 mm long. The pieces were bent along a ring having a diameter of 500 mm, so as to force them into a reversed U-shape, and subsequently bent in a reverse direction forcing them into U-shape within one cycle. Exfoliation of the thermally sprayed layers from the aluminum cores was inspected after ten cycles of such a bending of the tube pieces.

Brazeability

The 'bonded ratio' of the specimens was determined in the same manner as in the first embodiment.

Corrosion Resistance

Corrosion resistance of Example Nos. 41 and 54 was inspected in the same manner as in the first embodiment.

A result of those tests is given in Table 4.

TABLE 3

| | Silicon Powder ('Si' powder) | | Zn or Zn-alloy Powder ('Zn' powder) | | | | Ratio in weight of 'Si' powder to 'Zn' powder |
|---|---|---|---|---|---|---|---|
| Examples | Av. dia. (μm) | Ratio of sphr. (wt. %) | Type | Zn cont. (wt. %) | Av. dia. (μm) | Ratio of sphr. (wt. %) | |
| 41 | 50 | 50 | A | 95 | 100 | 50 | 80:20 |
| 42 | 4 | 50 | A | 95 | 100 | 50 | 80:20 |
| 43 | 250 | 50 | A | 95 | 100 | 50 | 80:20 |
| 44 | 50 | 0 | A | 95 | 100 | 50 | 80:20 |
| 45 | 50 | 50 | A | 10 | 100 | 50 | 80:20 |
| 46 | 50 | 50 | A | 95 | 300 | 50 | 80:20 |
| 47 | 50 | 50 | A | 95 | 100 | 0 | 80:20 |
| 48 | 50 | 50 | A | 95 | 100 | 50 | 98:2 |
| 49 | 50 | 50 | A | 95 | 100 | 50 | 30:70 |
| 50 | 50 | 50 | A | 95 | 100 | 50 | 80:20 |
| 51 | 50 | 50 | A | 95 | 100 | 50 | 80:20 |
| 52 | 50 | 50 | A | 95 | 100 | 50 | 80:20 |
| 53 | 50 | 50 | A | 95 | 100 | 50 | 80:20 |
| 54 | 50 | 50 | B | 100 | 100 | 50 | 80:20 |
| 55 | 70 | 30 | B | 100 | 80 | 60 | 70:30 |
| 56 | 30 | 70 | A | 60 | 120 | 60 | 50:50 |

Notes:
A = Zn—Al alloy powder,
B = Zn powder,
Av. dia. = Average diameter,
sphr. = spherical particles,
cont. = content

TABLE 4

| Examples | Condition of spraying | | Amount of of sprayed 'Si' + 'Zn' powders (g/m²) | Resistance to exfoliation of sprayed layer(*2) | Brazeability (ratio of bonded fins) (%) | Corrosion resistance (corroded depth of tubes) (μm) |
|---|---|---|---|---|---|---|
| | Distance (mm) (*1) | Temperature (° C.) | | | | |
| 41 | 250 | 3200 | 14 | excel. | 100 | 130 |
| 42 | 250 | 3200 | 16 | excel. | 81 | — |
| 43 | 250 | 3200 | 8 | excel. | 70 | — |
| 44 | 250 | 3200 | 12 | excel. | 96 | — |
| 45 | 250 | 3200 | 15 | good | 89 | — |
| 45 | 250 | 3200 | 10 | good | 88 | — |
| 47 | 250 | 3200 | 12 | excel. | 97 | — |
| 48 | 250 | 3200 | 15 | good | 84 | — |
| 49 | 250 | 3200 | 13 | excel. | 86 | — |
| 50 | 40 | 3200 | 17 | excel. | 77 | — |
| 51 | 500 | 3200 | 9 | good | 75 | — |
| 52 | 250 | 1000 | 11 | good | 76 | — |
| 53 | 250 | 9000 | 16 | excel. | 80 | — |
| 54 | 250 | 3200 | 15 | excel. | 100 | 130 |
| 55 | 200 | 2800 | 16 | excel. | 100 | — |
| 56 | 200 | 2500 | 13 | excel. | 100 | — |

Notes:
(*1)distance between nozzle and aluminum core,
(*2)'excel.' = no exfoliation found,
'good' = slight and partial exfoliation found, but not serious in practical use,
'worst' = serious exfoliation over a wide range The test result showed that the samples of aluminum material of the present invention had not only a thermally sprayed layer firmly sticking to, and thus highly resistant to exfoliation from, the core, but also were highly brazeable and resistant to corrosion. One group of the samples, that is, Example Nos. 41, 44, 47 and 54 to 56 were prepared by completely melting the zn or its alloy powder and by inhibiting Si powder from melting. Therefore, their sprayed layers more firmly stuck to the cores than a further group of Example Nos. 45, 46, 51 and 52, and were more highly brazeable than a still further group of Example Nos. 42 and 53. Samples in the further group were prepared under a condition such that Zn or its alloy powder was not fully molten, whilst Si particles in the samples in said still further group were not fully protected from melting. Relative quantity of Zn or its alloy powder was insufficient in Example No. 48, so that its exfoliation resistance was poorer a little than the other samples. On the other hand, a slightly poor brazaability was observed in the test of Example No. 49 prepared with an insufficient Si powder, and also in the test of Example No. 50 prepared by the spray gun set so near the aluminum core that Si powder was violently oxidized. A lesser amount of the sprayed powders in Example Nos. 43, 46, 51 and 52 also resulted In a slightly poor brazeability.

Third Embodiment

An amount of flux was added to each blend of the first powder with the second powder in Example Nos. 41 to 44 as listed in Table 3 in the second embodiment, before thermally spraying them. Ratio in weight of the powder mixture to the flux was 85:15 or 90:10.

The powder mixtures each containing the flux were then thermally sprayed under the same condition as that for the Example Nos. 41 to 44. Heat exchanger samples were assembled in the same manner as in the second embodiment, but without applying any flux emulsion to those brazeable aluminum materials. 'Bonded ratio' of the corrugated fins was measured to give a data comparable with those for Example Nos. 41 to 44 in the second embodiment.

What is claimed is:

1. A method of producing a brazeable aluminum material composed of an aluminum core, the method comprising the steps of:
preparing a first powder as well as a second powder;
wherein the first powder is one or more brazing metal powders selected from a group consisting of a mixture of Al and Si powders, an Al-Si alloy powder and a Si powder, and the second powder is a zinc powder or a Zn alloy powder and an average diameter of the first powder is from about 10 µm to about 200 µm and an average diameter of the second powder is from about 10 µm to about 200 µm;

then blending the first powder with the second powder so as to form a powder mixture, wherein a ratio by weight of the first powder to the second powder in the powder mixture is from about 30:70 to about 95:5; and thermally spraying the powder mixture onto the aluminum core so as to form a thermally sprayed layer, with particles of the second powder being molten while particles of the first powder remain either solid or with molten surfaces, wherein the thermally sprayed layer has a thickness of 10 µm or more and comprises a plurality of particles of brazing metal dispersed in Zn or Zn alloy, and Zn content of the thermally sprayed layer is from about 6 g/m$^2$ to about 20 gm$^2$.

2. The method as defined in claim 1, wherein a flux powder is further blended in the powder mixture of the first powder and second powder.

3. The method as defined in claim 2, wherein a ratio in weight of a sum of the first powder and the second powder to the flux falls is included in a range of about 95:5 to about 60:40.

4. The method as defined in claim 1, wherein the step of thermally spraying the powder mixture is carried out at a temperature falling within a range of about 1000° C. to about 3000° C.

5. The method as defined in claim 1, wherein the first powder is a Si powder, and the step of thermally spraying the powder mixture is carried out at a temperature falling within a range of about 2000° C. to about 4000° C.

6. The method as defined in claim 1, wherein the content of Zn in the second powder is about 40% by weight or more.

7. The method as defined in claim 6, wherein the content of Zn is about 85% by weight or more.

* * * * *